United States Patent
Sanghamitra et al.

(10) Patent No.: US 10,660,154 B2
(45) Date of Patent: May 19, 2020

(54) POSITIONING SYSTEM LEVERAGED FOR INSTALLATION AND COMMISSIONING

(71) Applicant: Honeywell International Inc., Morristown, NJ (US)

(72) Inventors: Gutha Stalin Sanghamitra, Bangalore (IN); Patrick Gonia, Maplewood, MN (US); Philipp Roosli, Niantic, CT (US); Bernard T. Geary, Fairlawn, OH (US)

(73) Assignee: Honeywell International Inc., Morris Plains, NJ (US)

( * ) Notice: Subject to any disclaimer, the term of this patent is extended or adjusted under 35 U.S.C. 154(b) by 589 days.

(21) Appl. No.: 14/597,000

(22) Filed: Jan. 14, 2015

(65) Prior Publication Data
US 2016/0205721 A1 Jul. 14, 2016

(51) Int. Cl.
*H04W 84/18* (2009.01)
*G01S 5/00* (2006.01)
*H04W 64/00* (2009.01)
*G01S 5/02* (2010.01)

(52) U.S. Cl.
CPC ............ *H04W 84/18* (2013.01); *G01S 5/00* (2013.01); *G01S 5/0205* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 8,311,548 B2 | 11/2012 | Zumsteg et al. | |
| 8,957,812 B1 * | 2/2015 | Hill | G01S 5/0027 342/445 |
| 9,167,554 B1 * | 10/2015 | Sjolund | H04W 64/003 |
| 2002/0046259 A1 * | 4/2002 | Glorikian | G06F 17/3087 709/218 |

(Continued)

FOREIGN PATENT DOCUMENTS

JP 2005063335 A 3/2005
JP 5389778 B2 1/2014

OTHER PUBLICATIONS http://www.idownloadblog.com/2013/03/23/apple-buys-wifislam/, "Apple Acquires Indoor GPS Company WiFiSLAM for $20 Million," 5 pages, Mar. 23, 2013, printed Jan. 15, 2016.

(Continued)

*Primary Examiner* — Reema Patel
*Assistant Examiner* — Steven M Christopher
(74) *Attorney, Agent, or Firm* — Seager, Tufte & Wickhem LLP

(57) ABSTRACT

A leveraged positioning system for installation of devices within campuses and buildings. A mobile device may have a position indicator associated with it. A campus or building information model may be available for reference relative to a location of the mobile device as noted by the position indicator. A location name may be derived from the model and used for an installed device since the mobile device is at the position of the installed device during placement of the installed device. A physical address may be assigned to the installed device. The physical address and the location name may be stored as a pair in memory for the device. Additional devices for installation may be treated similarly.

1 Claim, 6 Drawing Sheets

(56) References Cited

U.S. PATENT DOCUMENTS

| | | | | |
|---|---|---|---|---|
| 2003/0118015 A1* | 6/2003 | Gunnarsson | .......... | H04W 48/16 |
| | | | | 370/389 |
| 2010/0034119 A1 | 2/2010 | Van Steen et al. | | |
| 2010/0289640 A1* | 11/2010 | Annamalai | ............. | H04W 4/02 |
| | | | | 340/539.13 |
| 2014/0023363 A1* | 1/2014 | Apte | ................... | H04L 12/2803 |
| | | | | 398/43 |
| 2014/0066095 A1* | 3/2014 | Huang | .................. | G01S 5/0027 |
| | | | | 455/456.2 |
| 2014/0141805 A1* | 5/2014 | Mirov | ................... | H04W 4/023 |
| | | | | 455/456.3 |
| 2016/0337796 A1* | 11/2016 | Pandharipande | ....... | H04W 4/02 |

OTHER PUBLICATIONS http://9to5mac.com/2014/06/05/apple-brings-multipeer-connectivity-to-mac-enables-cross-platform-nearby-networking-w-ios/, "Apple Brings Multipeer Connectivity to Mac, Enables Cross-Platform Nearby Networking w/iOS," 48 pages, Jun. 5, 2014, printed Jan. 15, 2016.

http://www.gpsbusinessnews.com/All-You-Need-to-Know-about-Indoor-Location-in-Apple-iOS8_a4923.html, "All You Need to Know About Indoor Location in Apple iOS8," 2 pages, printed Jan. 15, 2016.

http://devstreaming.apple.com/videos/wwdc/2014/708xxvfd08bdof2/708/708_sd_taking_core_location_indoors.mov?dl=1, This reference is unable to be uploaded to the USPTO website because it is a video, the video can be viewed at the link cited, dated 2014.

* cited by examiner

| Device address | Location |
|---|---|
| 1111 | Tower1\Floor1\Zone1 |
| 2222 | Tower1\Floor1\Zone2 |
| ABC | Tower1\Floor1\Room1 |
| XYZ | Tower1\Floor1\Room2 |

Figure 5

POSITIONING SYSTEM LEVERAGED FOR INSTALLATION AND COMMISSIONING

BACKGROUND

This disclosure pertains to devices and particularly to installation of devices in buildings.

SUMMARY

The disclosure reveals a leveraged positioning system for installation of devices within campuses and buildings. A mobile device may have a position indicator associated with it. A campus or building information model may be available for reference relative to a location of the mobile device as noted by the position indicator. A location name may be derived from the model and used for an installed device since the mobile device is at the position of the installed device during placement of the installed device. A physical address may be assigned to the installed device. The physical address and the location name may be stored as a pair in memory for the device. Additional devices for installation may be treated similarly.

BRIEF DESCRIPTION OF THE DRAWING

FIG. 5 is a diagram of a table that correlates the device addresses with locations of the devices.

DESCRIPTION

Figure 1:
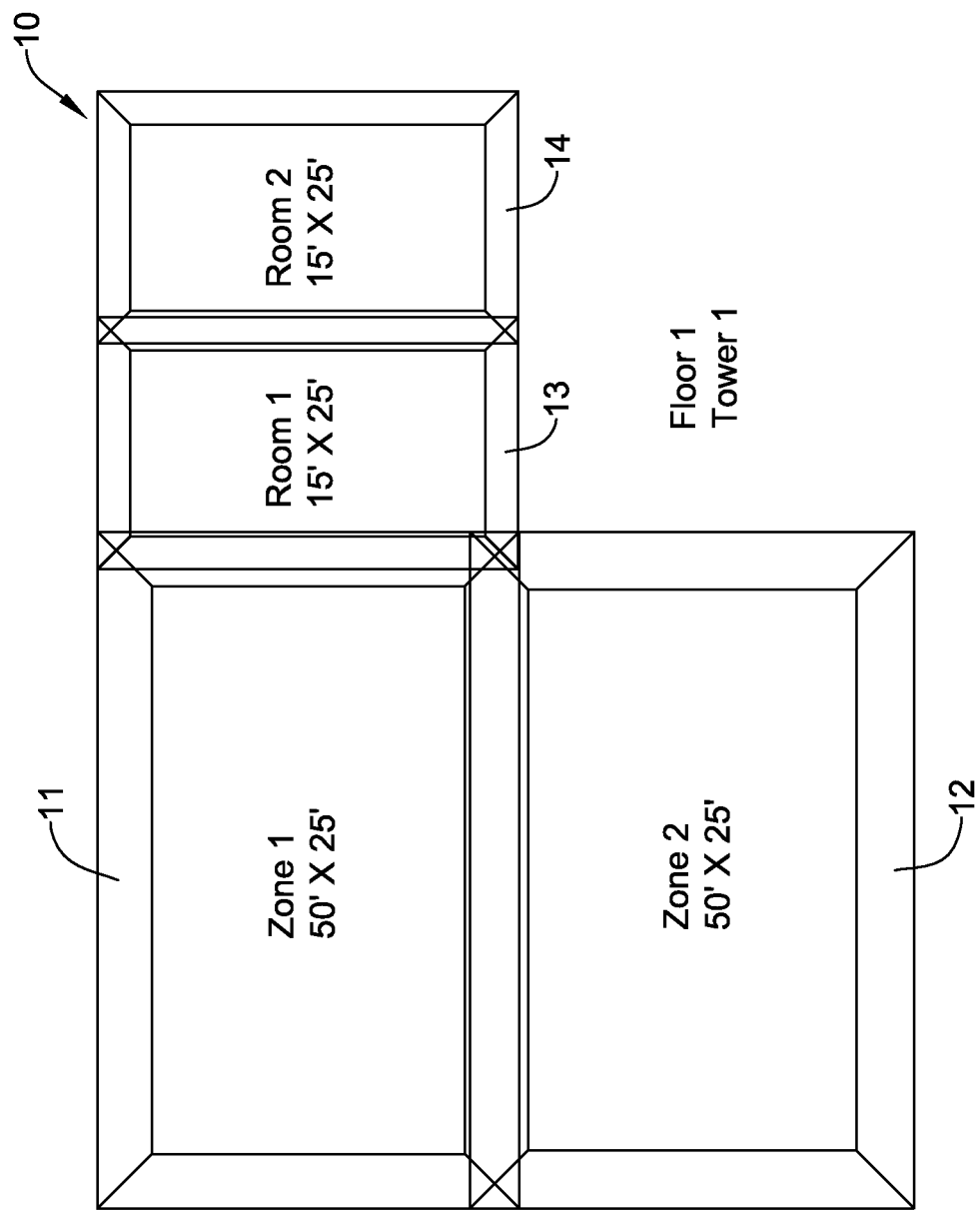
FIG. 1 is a diagram of a sample of a simple building model.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present approach may involve leveraging indoor positioning systems (IPS) to automate steps in installation and commissioning of devices or the like to eliminate wiring and address matching errors. Physical installation and commissioning of building automation devices may include several steps that are error prone. The installer often times is not necessarily the same individual who commissions or configures the system, but could be the same individual, group or entity. For example, a building contractor may sub-contract installation and wiring to an electrical subcontractor who uses riser diagrams and wiring diagrams provided to physically install devices and assign physical addresses. BACnet MSTP devices may often require setting of MSTP addresses using dip switches.

There may necessarily be no easy methods/tools available to the installer to physically verify whether the installation has matched an intended design.

The devices may be or relate to components of heating, ventilation and air conditioning (HVAC) systems, security systems, refrigeration systems, fire systems, closed circuit television systems, and other applicable systems.

The commissioning process may require matching physical device addresses to logical devices defined in the configuration database. A mismatch in a physical device address to logical device mapping may be difficult to troubleshoot.

Relative to BACnet, the manual steps involved in assigning an MSTP address may be eliminated. A physical address may automatically be generated by a tool provided to the installer. The tool may keep track of a physical address against physical location information. Relative to Lonworks, the physical neuron ID may be associated and stored along with the physical location information. As to other networks, in similar fashion, the network MAC address may be matched and stored along with the corresponding physical location information.

When the installer is done with a physical installation, the tool that the installer carries may contain the mapping between physical locations and network MAC addresses. This information may then be transferred to the configuration database for the system.

Indoor position tracking systems appear now to be maturing and several technologies may be available in the market such as a Wi-Fi based relative position tracking system, as an APP in mobile phones and may provide position information via API.

The installer may be provided a tool that will allow the installer to assign location information to the device being installed. The tool may automatically generate and assign a unique physical address (e.g., an MSTP address) associated to the physical location. Both the physical location and the auto generated physical address may be "assigned"/"stored" in the device during installation (e.g., using an external storage device like an SD memory card or stick).

The installer may then transfer the physical location and physical address mapping information to the configuration database. Later during commissioning, when the devices are powered up, they may get their physical addresses from the local SD memory card. The tool may then transfer the configuration data to the target device using the assigned physical address. Physical locations (e.g., x,y,z coordinates) may need to be presented to the installer in a user friendly manner (e.g., floor1-room2) using a 3D/BIM (building information modeling) model of the building.

The physical installation of devices like controllers/wall modules/sensors in a building may often be a distinct activity performed by an "installer". The installation may be followed by another activity of "comissioning the devices" which may be performed by a different individual (e.g., a comissioning engineer), or the same individual, group or entity at a different point in time and involve "downloading" configuration data that is created/defined offline from a comissioning tool (e.g., a computer/laptop/mobile phone or tablet) and a "configuration database". The process of comissioning may often rely on matching specific devices in the network with the "device" entities defined in the configuration database.

The present system may automate the configuration process, by eliminating the manual steps involved in matching physical devices to entities in the database. A logical sequence of steps involved in auto configuring a device by assigning location name to the device that is being installed and configured may be outlined herein.

One sequence may involve a location names assigned to and stored in installed devices. Installed devices may also be regarded as situated devices, placed devices, non-mobile devices, fixed devices, immobile devices, or other like-kind devices. First, a campus/building model that includes dimensions and locations of various buildings/floors, including dimentions of various rooms, zones, areas, and so on, along with their names (e.g., "Tower 1", "Conference 1A", and so on) may be made available to a device. The device may be a mobile device like a mobile-phone, a tablet or a laptop having computing capabilities.

Second, the mobile device may use indoor positioning and location tracking mechanisms using technologies including, but not limited to, bluetooth LE (BLE), Wi-fi traingulation, and so on, to determine its current position, i.e., "location coordinates" within a building. One may note that the technology to locate an indoor position may be built into the computing device that the installer is carrying (e.g., a mobile phone, tablet, or laptop) or it may be built into a stand-alone special purpose device that is designed just for the purpose of location identification. In case a special purpose device is used for location identification, the information should be transferred to the mobile computing device being used by the installer.

Third, the "location coordinates" may be relative to a well-known position known to the mobile device. The mobile device may use the position information to determine the name of the current location (viz., location name) by looking it up in the building model.

Fourth, the location name may then be transferred to the device, such as a controller, being installed in the building through approaches including (but not limited to): 1) copy and transfer via an SD memory card or stick; and 2) transfer using wireless (e.g., NFC/bluetooth/WiFi) communication between the mobile device (i.e., mobile phone/tablet or laptop) and the device being installed (i.e., HVAC controller, wall module, temperature sensor, and so forth).

Fifth, the installed devices may now be aware of their location within a campus/building. This enables the configuration data for these devices to be automatically pushed from the configuration database/tool to the devices using multiple approaches including but not limited to the following.

In the first approach, the device may connect to the "configuration database"/"tool" and indicate its location name and model information and request its configuration data. This may also imply that, if the "location name" of the device is changed at any time during its life time, even after the initial installation, it can automatically seek and request a configuration update.

In the second approach, the comissioning engineer may initiate an "auto-download" command from the comissioning tool. The tool may query the devices for their "location names" and match the physical devices with entities in the database using the "location names" for look-up/matching. Once a match is established, the tool may download the configuration data to the respective device.

Another sequence may involve an installer creating a map/table to correlate physical addresses with locations. First, a campus/building model that includes dimensions and locations of various buildings/floors, including dimensions of various rooms, zones, areas, and so on, along with their names (e.g., "Tower 1", "Conference 1A", and so forth) may be made available to a mobile device. The mobile device may be a mobile-phone, a tablet computer, a laptop, or the like.

Second, the mobile device may use indoor positioning and location tracking mechanisms using technologies including, but not limited to, bluetooth LE (BLE), WiFi triangulation, and so forth, to determine its current position, i.e., "location coordinates" within a building. One may note that the technology to locate indoor position may be built into the computing device that the installer is carrying (e.g., mobile phone, tablet, or laptop) or it may be built into a stand-alone special purpose device that is designed just for the purpose of location identification. In case a special purpose device is used for location identification, then this information should be transferred to the mobile computing device being used by the installer.

Third, the "location coordinates" may be relative to a position that is known to the mobile device. The mobile device may use the position information to determine the name of the current location by looking it up the in the building model.

Fourth, the installer may then manually input or enter the physical address of the device being installed to the mobile device. Alternately, this information may be automatically gathered by the mobile device by reading a QR code or other optically read label on the device being installed or by electronic transfer such as, but not limited to, WiFi, Bluetooth or other near or far field wireless technologies including IR. The mobile device may store the physical address and the location name pair in a map/table in its non-volatile storage. The information stored may include triangulation data used for locating the device, such that this triangulation data could be used to improve the accuracy of determining the location of the device during follow-up visits at a later point in time. When multiple devices are placed in close proximity in a given location, the mobile computing device may allow the installer to select the specific device to be associated with the location and also append additional data to each device in order to uniquely identify them.

Fifth, the installer may repeat the process for virtually all of the devices being installed. At the end of the installation process, the mobile device may have a list of "physical address"/"location name" pairs.

Sixth, the installer may transfer the data to the comissioning engineer. The comissioning engineer may feed the data into the "configuration database"/"comissioning tool".

Seventh, the comissioning engineer may initiate an "auto-download" command from the comissioning tool. The tool may query the database for configuration data intended for each device and look up the physical address of the device using the map/table and download the configuration data to the device.

Some features that may distinguish the present system are noted. The present system does not necessarily map physical addresses of devices with logical addresses. The system may deal with automatic detection of physical location of a device and using that information to map the device to a logical device in a database. The aspect of using location information may be determined automatically. There may be references to using physical location information of the device. There may be a reference to automatic detection of location or using physical location to match a logical device defined in a database. The system does not necessarily depend on each of the installed devices being a wireless device. The system does not necessarily depend on estimating the distance between installed devices. The system may depend on determining the relative position of a mobile device that an installer is carrying relative to other triangulation beacons. As the installer moves around a building, his/her relative position may be tracked and used to infer a physical location of the device being installed. The device being installed itself does not necessarily have to be capable of wireless communication.

FIG. 1 is a diagram of a sample of a simple building model 10. The model may regarded as showing a floor 1 of a tower 1. Floor 1 may incorporate a 50 foot by 25 foot zone one 11 and a 50 foot by 25 foot zone two 12. Floor 1 may also incorporate a 15 foot by 25 foot room one 13 and a 15 foot by 25 foot room two 14.

Figure 2:
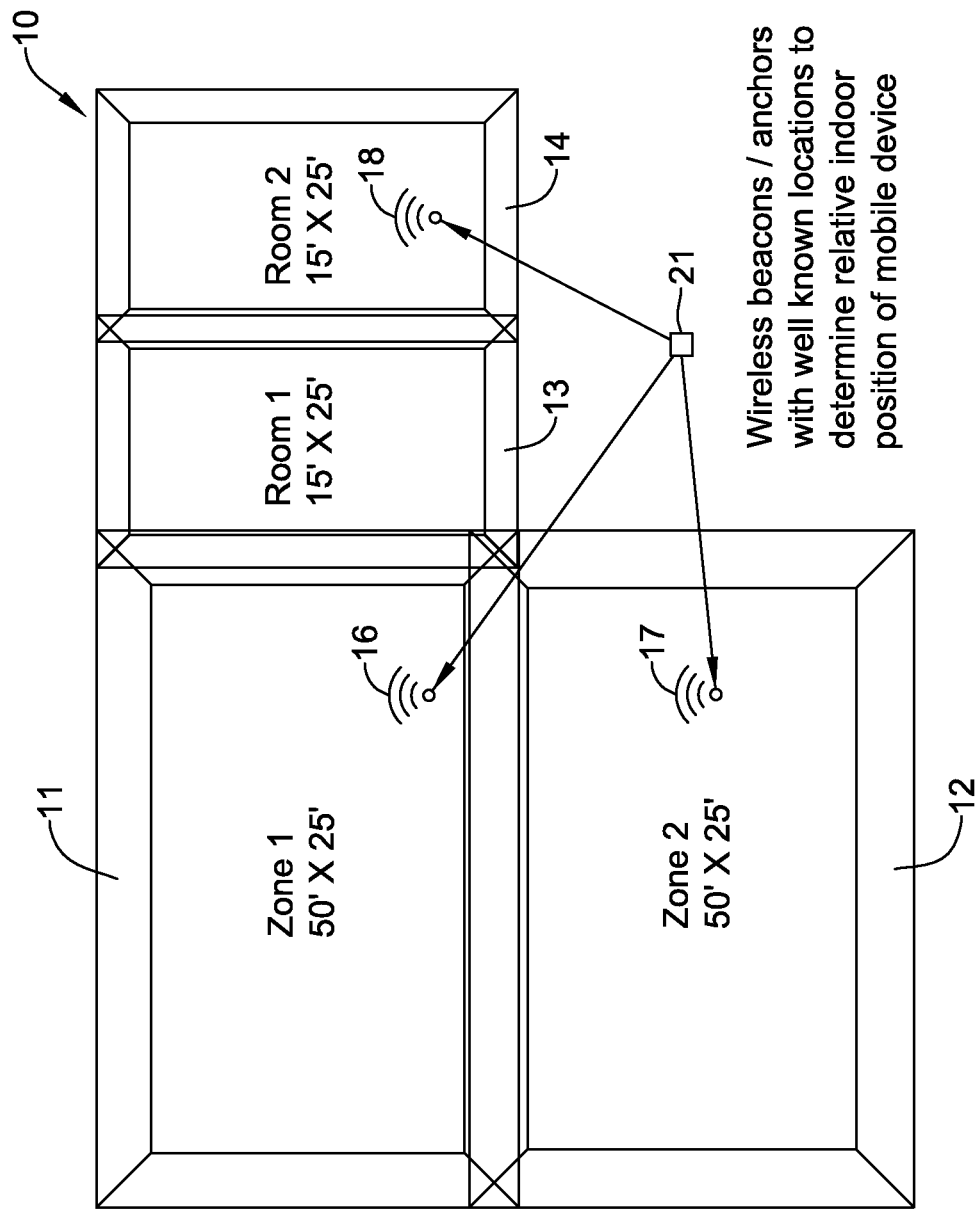
FIG. 2 is a diagram of a location tracking infrastructure with reference beacons that are used as reference anchors to determine the current relative location of a mobile device.
Figure 3:
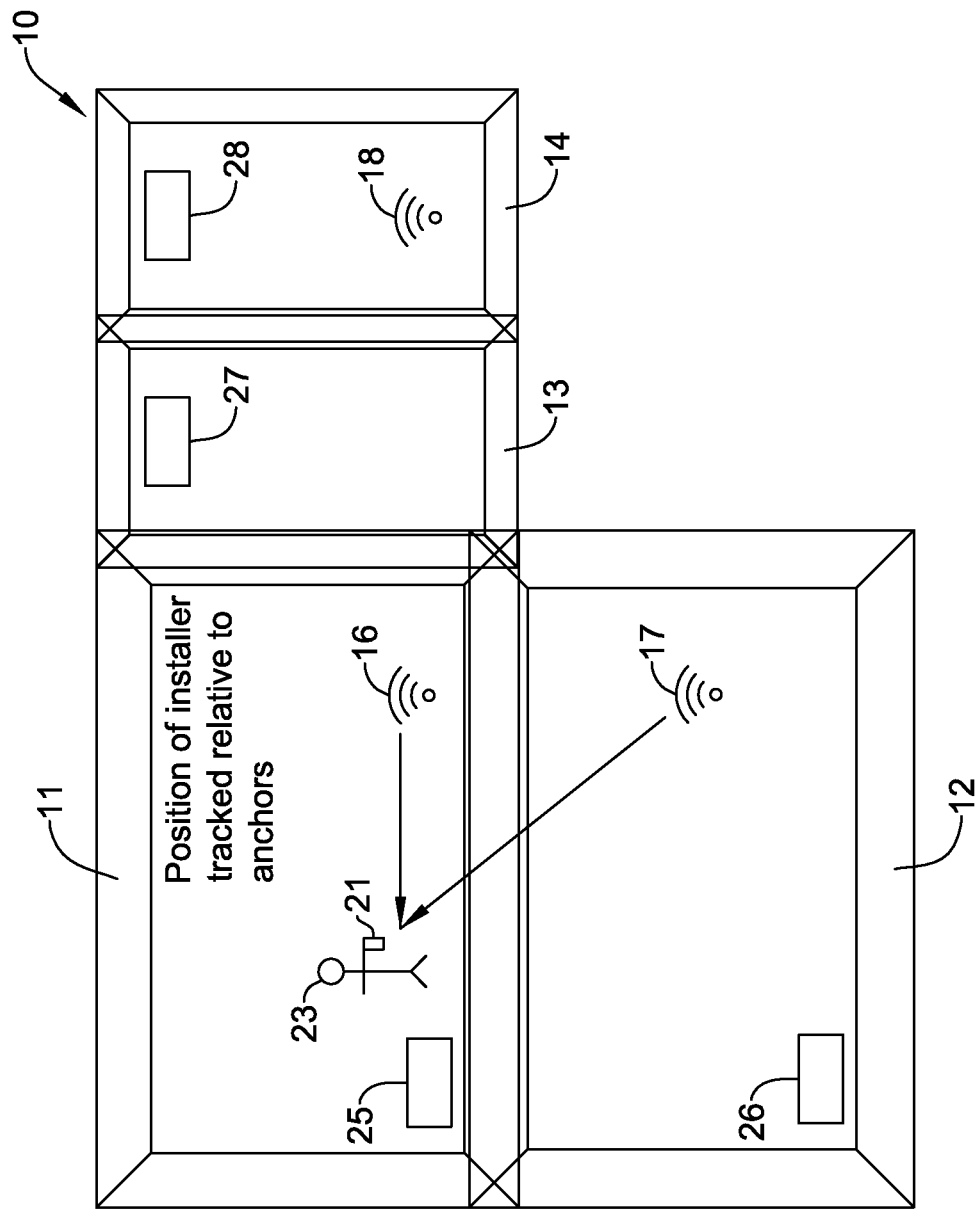
FIG. 3 is a diagram of an installer that carries a device whose position is tracked relative to anchors.
Figure 4:
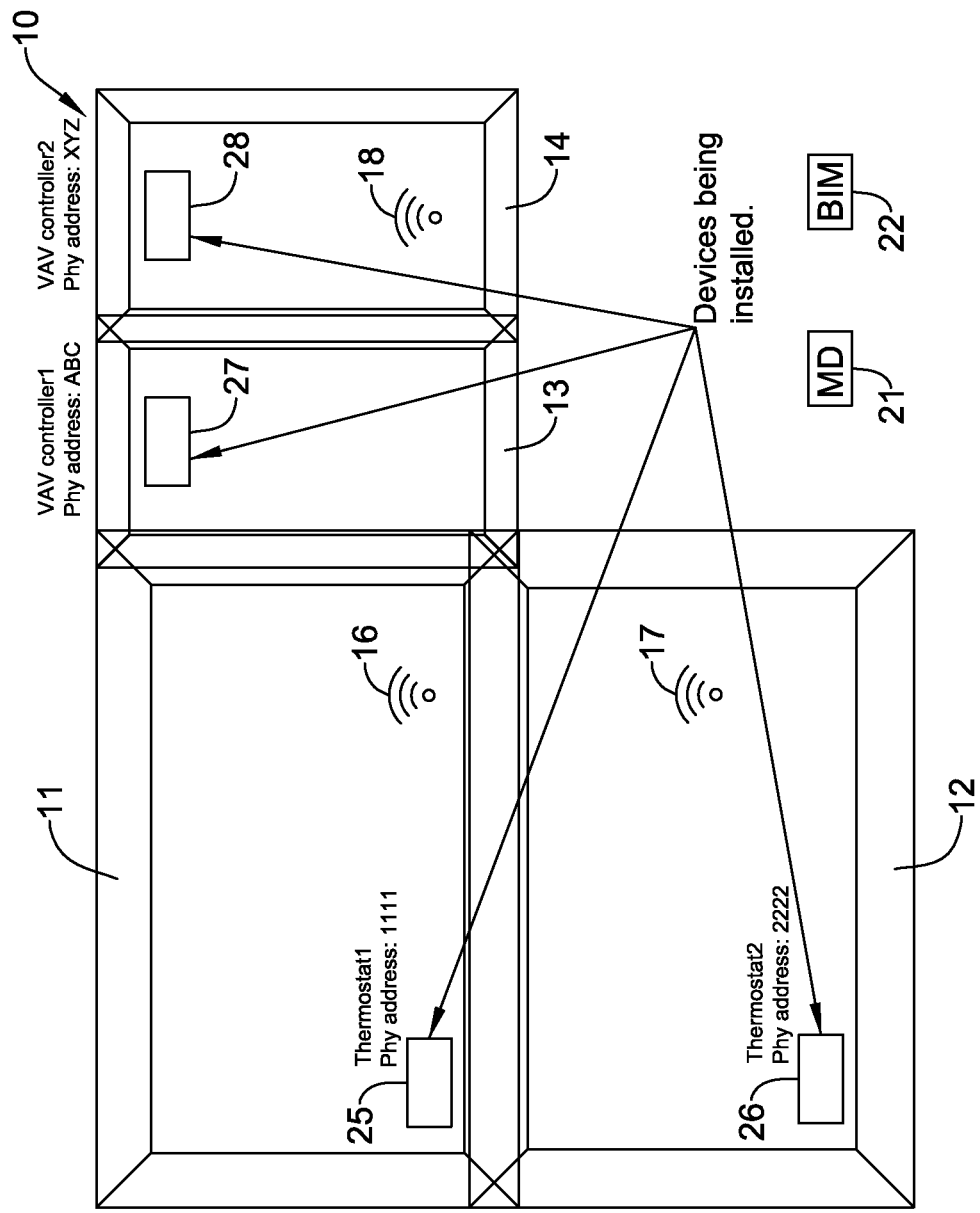
FIG. 4 is a diagram of the physical addresses of devices being installed that are mapped to their locations.

FIG. 2 is a diagram of building model 10 showing three wireless anchors or beacons 12, 13 and 14 situated in zone 16, zone 17 and room 14, respectfully. Beacons 12, 13 and 14 may be situated at known locations. FIG. 3 is a diagram that show from the locations of the beacons, a mobile device (MD) 21 detecting electromagnetic (EM) waves from beacons 12, 13 and 14 may determine its relative indoor position. A position of an installer 23 having mobile device 21 may be tracked relative to locations of bescons 16 and 17. FIG. 4 is a diagram of devices 25, 26, 27 and 28 installed on floor 1 of tower 1. Device 25 may be a first thermostat having a physical address 1111. Device 26 may be a second thermostat having a physical address 2222. Device 27 may be a first VAV controller having a physical address ABC. Device 28 may be a second VAV controller having a physical address of XYZ. Location names may be obtained with an aid of 3D/BIM (building information modeling) 22. FIG. 5 is a diagram of a list or table 20 that correlates the device addresses with locations of the devices. The device addresses 1111, 2222, ABC and XYZ may correspond to locations Tower1/Floor1/Zone1, Tower1/Floor1/Zone2, Tower1/Floor1/Room1 and Tower1/Floor1/Room2 of devices 25, 26, 27 and 28, respectively.

Figure 6:
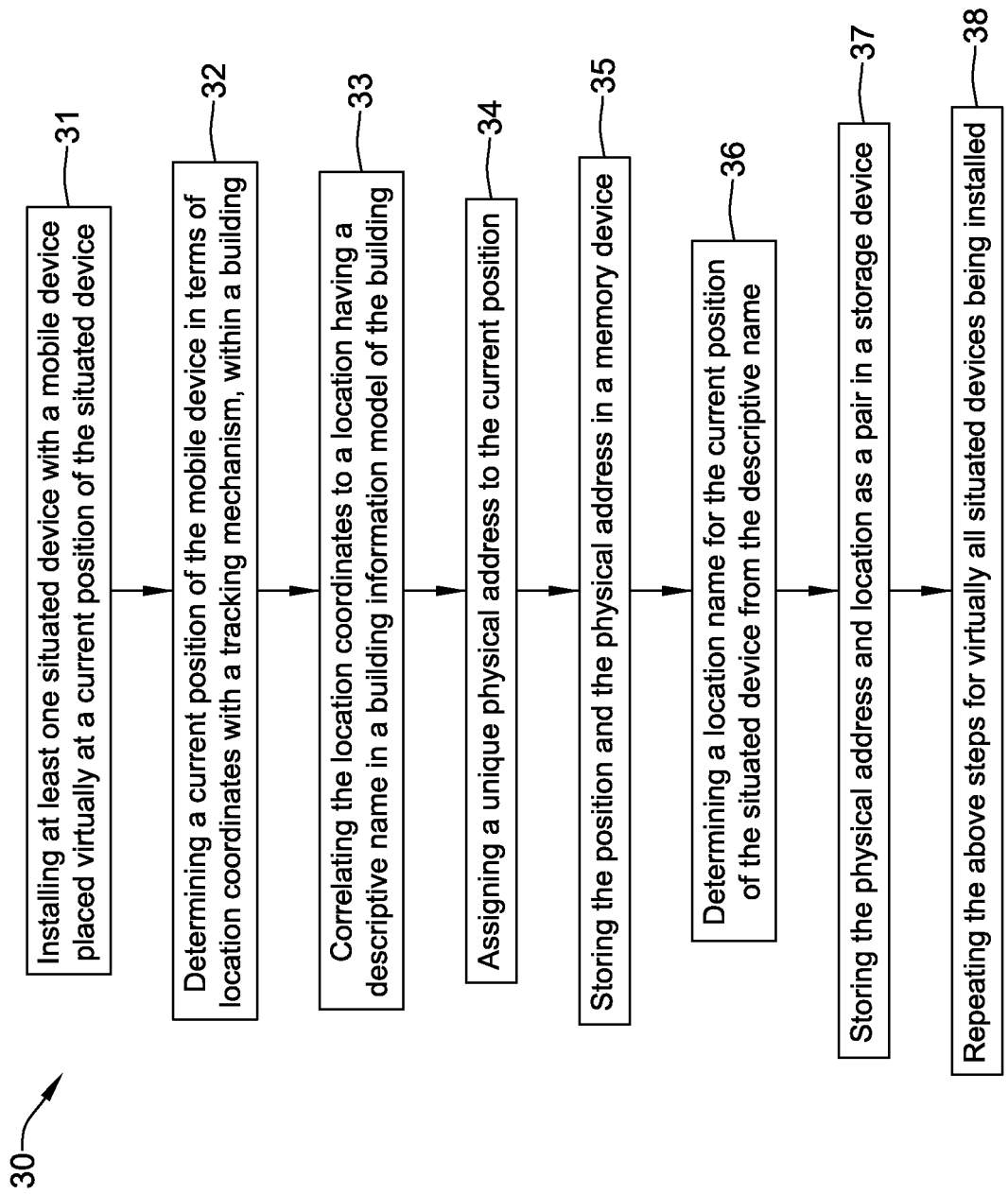
FIG. 6 is a diagram of an illustrative aspect of the present approach.

FIG. 6 is a flow diagram 30 of one aspect of the present approach. Step 31 may incorporate installing at least one situated device with a mobile device placed virtually at a current position of the situated device. Step 32 may incorporate determining a current position of the mobile device in terms of location coordinates with a tracking mechanism, within a building. Step 33 may incorporate correlating the location coordinates to a location having a descriptive name in a building information model of the building. Step 34 may incorporate assigning a unique physical address to the current position. Step 35 may incorporate storing the position and the physical address in a memory device. Step 36 may incorporate determining a location name for the current position of the situated device from the descriptive name. Step 37 may incorporate storing the physical address and location as a pair in a storage device. Step 38 may incorporate repeating the above steps for virtually all situated devices being installed. Some of the steps may be implemented by a computer or processor.

To recap, a leveraged indoor positioning system may incorporate a mobile device; a position indicator, which is a position tracking mechanism that is either built-in or connected to the mobile device; and a building information model incorporating data, related to locations and dimensions of parts of a building, available for reference to the mobile device. The position indicator may determine a current position in terms of coordinates of a reference system of the building information model for the mobile device. The current position may be looked-up in the building information model to determine data related to a location of the current position. The data related to the location may be transferred from the mobile device to an installed device.

The position indicator may have detection of one or more wireless beacons. The position indicator may determine the current position from a detection of data regarding the one or more wireless beacons, a direction and strength of a wireless signal, and a relative distance between the one or more wireless beacons and the position indicator.

The one or more wireless beacons may be an external device of the installed device that is used as aid for installation or may be built into a device being installed.

The data related to the location may be descriptive of the location indicated by the position indicator within the building information model.

A unique physical address may be assigned to the location of the current position of the installed device. The unique physical address and the location may be stored as a pair in a table in a storage memory. Additional one or more devices may be installed like the installed device.

One or more pairs of the physical addresses and the locations of the installed device and the additional one or more installed devices may be stored in the table in the storage memory.

A commissioning tool may have an auto-download command that can be executed to query the storage memory for configuration data for each installed device, look up a physical address of an installed device using the table, and download configuration data of the installed device to the installed device.

A leveraging mechanism of positioning may incorporate a campus or building information model, a mobile device, a position indicator associated with the mobile device, one or more situated devices, and a storage memory. The position indicator may provide a location to the mobile device. The location may be looked up by the mobile device in the campus or building information model to determine a location name. The location name may be transferred to a situated device installed at the location provided by the position indicator. The situated device may be a component of a building system. A building system may incorporate one or more items selected from a group consisting of heating, ventilation and air conditioning systems, security systems, refrigeration systems, fire systems, and closed circuit television systems.

Information regarding the situated device may be automatically or manually transferred from the situated device to the mobile device. The information may be transferred by an approach selected from a group consisting of optical reading a label on the situated device, infrared transmission, and RF transmission.

The location being provided to the mobile device and the location being looked up in the campus or building information model to determine a location name may be automated.

Configuration data for the one or more situated devices that have been installed may be automatically pushed from a configuration database to the one or more situated devices.

A situated device that has been installed may reveal its location name and model information, and request its configuration data from a configuration database.

If the location name of a situated device has changed, the situated device may automatically seek and request a configuration update.

The leveraging mechanism may further incorporate a commissioning tool. The commissioning tool may query the one or more situated devices for their location names and match the situated devices with entities in a database using the location names for look-up and match. Once a match is established, the commissioning tool may download configuration data of an entity corresponding to the location name used for the look-up and match, to the respective situated device.

An initiation of an auto-download command from the commissioning may result in a query of the one or more situated devices for their location names and matching the situated devices with entities in a database using location names for a look-up match, and, upon an establishment of a match, result in a download of configuration data of an entity corresponding to the location name used for the look-up and match, to the respective situated device.

The leveraging mechanism may further incorporate an installation tool. The installation tool may generate and assign a unique physical address to the location name of each of the one or more situated devices being installed. The physical address of each of the one or more situated devices may be input to the mobile device. The mobile device may store the physical address and the location name of each situated device as a pair in a storage memory resulting in a list of physical address and location name pairs for virtually all of the situated devices being installed.

An approach for leveraging an indoor positioning system, may incorporate installing at least one immobile device with a mobile device placed virtually at a current position of the immobile device, determining a current position of the mobile device in terms of location coordinates with a tracking mechanism, within a building, correlating the location coordinates to a location having a descriptive name in a building information model of the building, assigning a unique physical address to the current position, and storing the position and the physical address in a memory device.

The approach may further incorporate determining a location name for the current position of the immobile device from the descriptive name, storing the physical address and location as a pair in a storage device, and repeating steps of the present approach for virtually all immobile devices being installed.

At an end of the approach, a list of physical address and location name pairs may be situated in the storage device. A tool may query a database for configuration data intended for each immobile device and look-up a physical address of a device using the list of pairs and download configuration data to the immobile device.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for leveraging an indoor positioning system, comprising:
    installing at least one immobile device with a mobile device placed near a current position of the at least one immobile device;
    determining a current position of the mobile device in terms of location coordinates within a building with a tracking mechanism;
    correlating the location coordinates to a location having a descriptive name in a building information model of the building;
    assigning a unique physical address to the current position;
    storing the current position and the unique physical address in a memory device, thereby altering the memory device;
    determining a location name for the current position of the at least one immobile device from the descriptive name;
    storing the unique physical address and location as a pair in a storage device; and
    repeating steps of determining a location name for the current position of the at least one immobile device from the descriptive name and storing the unique physical address and location as a pair in a storage device for virtually all immobile devices being installed whereupon a list of unique physical address and location name pairs is situated in the storage device; and
    a tool queries a database for configuration data intended for each immobile device and look-up a physical address of a device using the list of unique physical address and location name pairs and download configuration data to the immobile device.

* * * * *